Patented Oct. 11, 1949

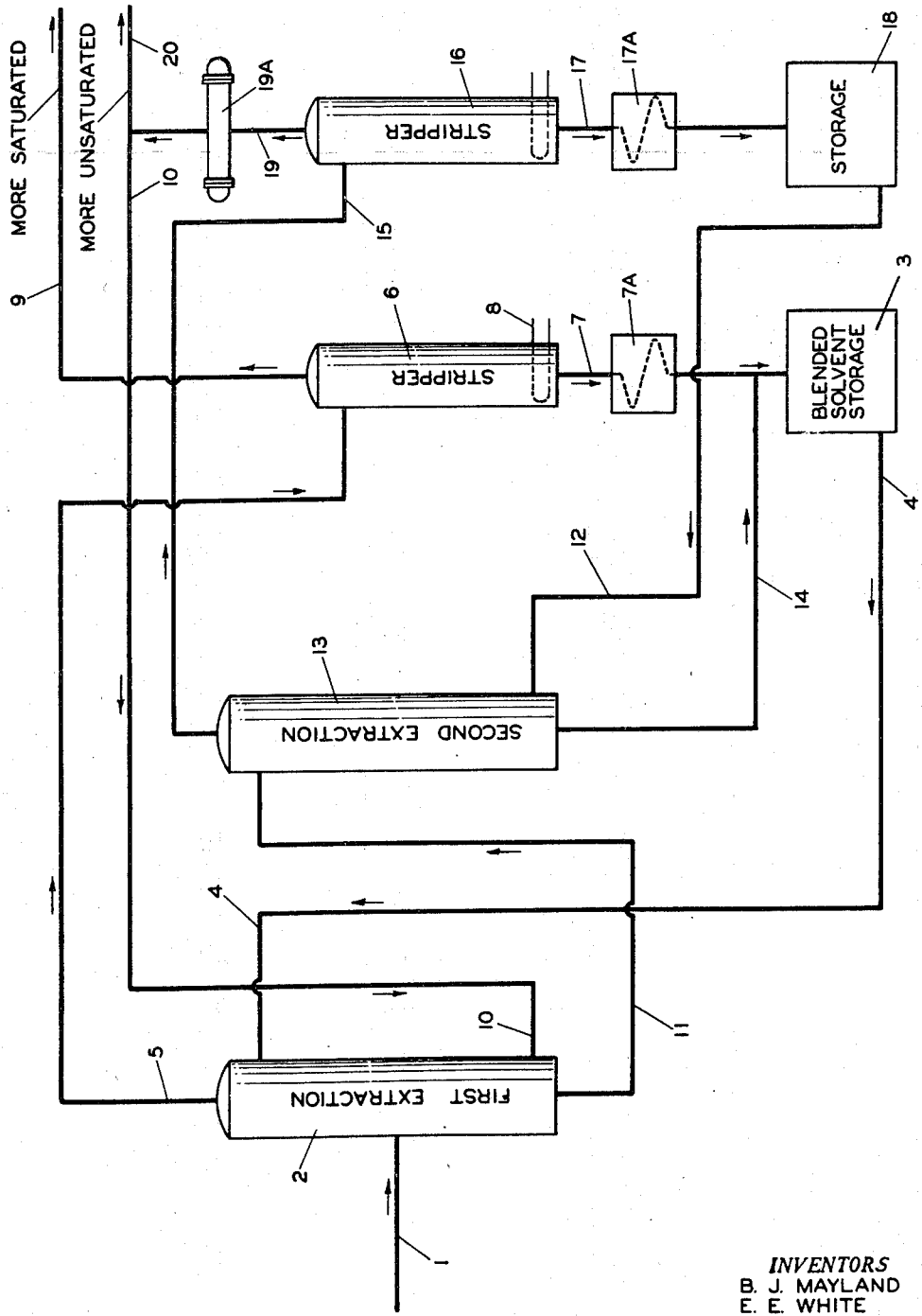

2,484,305

UNITED STATES PATENT OFFICE 2,484,305

PROCESS FOR THE SEPARATION OF UN-SATURATED ALIPHATIC HYDROCARBONS FROM MORE SATURATED ALIPHATIC HYDROCARBONS

Bertrand J. Mayland and Edward E. White, Bartlesville, Okla., assignors to Phillips Petroleum Company, a corporation of Delaware Application August 16, 1946, Serial No. 691,148

17 Claims. (Cl. 196—14.25)

1

This invention relates to a process for separating unsaturated aliphatic hydrocarbons from more saturated aliphatic hydrocarbons. In a typical embodiment it relates to the separation of aliphatic olefins or diolefins or both from the corresponding paraffin hydrocarbons, for example the separation of butenes and/or butadiene from normal butane. In another typical embodiment it relates to the separation of aliphatic diolefins from more saturated aliphatic hydrocarbons, namely olefins and/or paraffins, for example the separation of butadiene from butene especially butene-1 which cannot be separated from butadiene by ordinary fractional distillation because of the closeness of their boiling points.

The separation of olefins or diolefins from paraffinic hydrocarbon streams to obtain a substantially pure paraffinic stream and unsaturate stream usually cannot be simply accomplished because of the close boiling range of the compounds and because of the tendency to form azeotropes. For example the separation of butadiene and butenes from n-butane by straight fractionation is not possible due to the formation of a constant boiling mixture between butadiene and n-butane. Similarly the separation of diolefins from olefins by ordinary fractionation is often not possible.

It has heretofore been attempted to solve this problem by the use of azeotropic or extractive distillation whereby another component is added to the system which makes possible fractionation by changing the relative volatilities of the hydrocarbon. If the added component goes overhead this method of separation is referred to as azeotropic distillation. If the added material is removed in the kettle product the process is known as extractive distillation. The more selective the added component is, the greater the change in the relative volatilities. Polar compounds (i. e. compounds having a high dipole moment and a high internal solution pressure) are used as selective solvents for extractive distillation. In general, the greater the polarity is, the greater the selectivity but the lower the solubility. To decrease the height of a column necessary to effect the desired separation a highly selective added component is desired as the selective solvent. On the other hand, the hydrocarbon must have a moderate solubility in the solvent to limit the amount of solvent required to be added and to keep the diameter of the column within reason. The polar solvent chosen represents a compromise between these two extremes; i. e. selectivity is sacrificed for solubility.

The principal object of the present invention is to provide an improved method for separating unsaturated aliphatic hydrocarbons from more saturated aliphatic hydrocarbons. Another object is to provide an improved method of separating unsaturated aliphatic hydrocarbons from paraffin hydrocarbons. Another object is to provide an improved selective solvent for effecting separation of aliphatic hydrocarbons of different degrees of saturation by extractive distillation or liquid-liquid extraction. Another object is to provide an improved liquid-liquid extraction process for separating unsaturated aliphatic hydrocarbons, specifically olefins and/or diolefins, from more saturated hydrocarbons such as paraffins. Another object is to provide an improved method of carrying out liquid-liquid extraction of aliphatic hydrocarbons of different degrees of unsaturation whereby heat requirements are kept at a minimum. Numerous other objects will more fully hereinafter appear.

The accompanying drawing portrays diagrammatically one arrangement of equipment which has been found very satisfactory for carrying out liquid-liquid extraction as a means of separating aliphatic hydrocarbons of different degrees of saturation; the arrangement shown represents a preferred embodiment of our invention which is employed in order to greatly reduce the heat required to carry out the process.

The present invention provides a solution to the problem outlined above in that it makes available a solvent having both high selectivity and good solubility for the hydrocarbons. We have discovered that a solvent having greatly improved properties over ordinary polar solvents is obtained by blending a polar solvent with a solvent which exhibits compound-forming tendencies with the unsaturated hydrocarbons. The resulting solvent has improved selectivity over either of the solvents alone and greater solubility for the hydrocarbons. The blended solvent may be used in an extractive distillation process of the type now well known in the art. In conventional extractive distillation, the mixture of aliphatic hydrocarbons of varying degrees of saturation ranging from diolefins to paraffins is fed continuously to a combined fractional distillation-extraction column at an intermediate point therein, the relatively non-volatile selective solvent is continuously introduced at the top of the column and flows downwardly therein, the bottom of the column is reboiled in the usual way to drive out any of the more saturated hydrocarbon dissolved therein and to supply the heat required for the distillation, the top of the column is refluxed by returning a portion of the condensed more saturated hydrocarbon taken overhead, and the solvent rich in more unsaturated hydrocarbon is continuously fed to a stripping column where the unsaturated hydrocarbon content is stripped from the solvent.

The blended solvent of the present invention may also be used in a liquid-liquid extraction process. For example the mixture of two or more of paraffins, olefins and diolefins may be contacted countercurrently with the blended solvent in any suitable type of equipment such as a vertical column provided with means of obtaining intimate contact such as baffles, packing, bubble trays, etc. The resulting extract consisting essentially of solvent and dissolved more unsaturated hydrocarbons may then be stripped in a separate zone to recover the more unsaturated hydrocarbons. The extracted hydrocarbon stream, i. e. the raffinate, is composed essentially of the more saturated hydrocarbon, which was undissolved by the solvent, together with a small amount of dissolved solvent. This raffinate may be stripped or otherwise treated to separate essentially pure more saturated hydrocarbon from the dissolved solvent.

We much prefer, however, to use a special liquid-liquid extraction process which we have discovered and which provides a large saving of heat over either extractive distillation or conventional liquid-liquid extraction processes. Such a special process is described in detail below.

It can be shown that the selectivity of a polar solvent depends on the degree of polarity as well as on the difference of polarity between the compounds being separated. In the order of increasing polarity the $C_4$ hydrocarbons are n-butane, butenes, and butadiene. These compounds actually are relatively non-polar and form non-ideal solutions with highly polar compounds. The differences in polarity of these hydrocarbons determine their relative deviation from ideal solution laws. Butadiene being more polar will be more soluble in the polar solvent than n-butane under comparable conditions of temperature, pressure and concentration.

Blending two polar solvents results in a polar mixture having a polarity somewhere between the polarity of the individual solvents. The mixture would exhibit about the same degree of selectivity as a single solvent having polarity corresponding to the mixture and the hydrocarbon solubility would be similarly related. Thus the solvent obtained by blending two polar solvents would have little or no advantage over a single solvent of the same degree of polarity.

Some compounds show a tendency to form loose chemical compounds with the hydrocarbons. If this tendency is more pronounced with one type of hydrocarbon than with another or if the tendency is present with one of the hydrocarbon types and not with another, the solvent will have a certain amount of selectivity depending on the strength of the effect. A compound of this type may or may not be polar. If it is polar, the selectivity is due to the polarity as well as to the bonding tendency and the selectivity will be greater than that of an ordinary polar compound which does not exhibit the bonding tendency.

In accordance with our invention a selective solvent for the separation of aliphatic hydrocarbons of varying degrees of saturation is made by blending a polar solvent having no bonding tendency or only poor bonding tendency with the unsaturates with a solvent having such bonding tendency with the unsaturates. The resulting mixture shows selectivity due to the resulting polarity of the mixture and due to the bonding tendency with the unsaturates and is greatly superior to either component by itself.

By the term "polar" as used herein we mean a compound having a high polarity, i. e. a compound in which a dissolved non-polar compound such as gaseous normal butane at atmospheric condition has a high activity coefficient, namely, above 10. Methods of determining the activity coefficient of a compound such as normal butane in solution are well-known to those skilled in the art and need not be detailed herein. The activity coefficient is a measure of the deviation of the solution from ideality, a coefficient of unity indicating ideality, a coefficient greater than unity indicating solubility less than ideal (positive deviation) and a coefficient less than unity indicating solubility greater than ideal (negative deviation).

In general the polar compounds used in practicing our invention do not exhibit bonding tendency with unsaturates. Conversely the compounds exhibiting bonding tendency with unsaturates used in accordance with the present invention are, generally speaking, non-polar.

We have found that blending highly polar solvents with relatively non-polar solvents that exhibit strong valence forces with the unsaturates is a means of approaching the ideal solvent.

The compound exhibiting bonding tendency may display such tendency with diolefins but not with olefins or paraffins or with both diolefins and olefins but not with paraffins. In the first case the resulting blended solvent may be employed to separate diolefins from olefins and/or paraffins. In the second case it may be employed to separate diolefins and/or olefins from paraffins.

For example a blended solvent consisting of ethanolamine saturated with tetraethylorthosilicate may be used to separate diolefins or olefins or both from paraffins in accordance with our invention. However a solvent consisting of ethanolamine saturated with paraldehyde has an activity coefficient of less than unity with butadiene but greater than unity with butene-1 and n-butane and therefore can be used to separate butadiene from butene-1 or n-butane or both.

The process of our invention may be defined as a method of separating a hydrocarbon mixture containing at least one aliphatic unsaturated hydrocarbon having at least one and not more than two double bonds per molecule and at least one more saturated aliphatic hydrocarbon into a fraction rich in more saturated hydrocarbon, such as paraffin or olefin, and a fraction rich in more unsaturated hydrocarbon, such as diolefin or olefin, which comprises intimately contacting the hydrocarbon mixture to be separated with a liquid selective solvent consisting essentially of a polar solvent (in which normal butane at atmospheric conditions has an activity coefficient in excess of 10) and a solvent exhibiting compound-forming tendencies with the more unsaturated hydrocarbon and thereby effecting preferential solution of the more unsaturated hydrocarbon in the selective solvent.

The second component of the selective solvent of the present invention exhibits compound-forming tendencies with olefins or diolefins or both but is to be distinguished from a compound which actually forms compounds with olefins or diolefins. Examples of the latter type of compound are sulfur dioxide, cuprous salts, maleic anhydride. The compounds which we employ are generally characterized by being non-polar, i. e. in which n-butane has an activity coefficient greater than 1.0 but not greater than 2.0 and either butene or butadiene less than 1.0.

The extraction may be conducted with the hydrocarbon mixture in either the vapor or liquid phase. Where the mixture is in the vapor phase simple gas scrubbing may be practiced but extractive distillation is preferable. We prefer liquid-liquid extraction. The temperature may range from the freezing point of the solvent or components thereof up to the point of complete miscibility between the solvent and the hydrocarbon mixture. Temperatures below the critical temperature of the hydrocarbon mixture should of course be employed. Generally the temperature of extraction will be atmospheric or substantially atmospheric.

The pressure may vary over wide limits but should be sufficient to hold the hydrocarbon mixture in the liquid phase in order that liquid-liquid extraction may be practiced. At ordinary atmospheric temperatures of say 60 to 110° F., pressures of the order of 80 to 200 pounds per square inch gauge will be sufficient to prevent appearance of a gaseous phase to any appreciable extent.

The relative amounts of the blended solvent and the hydrocarbon feed employed will depend upon the concentration of the more unsaturated hydrocarbon to be separated in the hydrocarbon feed. It is of course preferable to use enough solvent to dissolve all of the more unsaturated hydrocarbon. In the interest of economical operation the amount of solvent should preferably be kept as close as is practical to the minimum required to dissolve completely the more unsaturated hydrocarbon content of the feed.

We have found it highly desirable and advantageous to carry out the extraction of the feed in a vertical elongated column or contacting zone, introducing the hydrocarbon mixture at an intermediate point and the solvent at one end, most conveniently at the top, contacting the feed countercurrently with the solvent in one end of the extraction zone and passing the resulting extract past the feed entry into the other portion, usually the lower, of the zone, and to introduce near the other end of the extraction zone a continuous stream (which may be termed "reflux") of more unsaturated hydrocarbon separated from the resulting extract. Introduction of this more unsaturated stream effects displacement from the solvent of any dissolved more saturated hydrocarbon and gives a much purer fraction of more unsaturated hydrocarbon.

The raffinate from the extraction step consists essentially of the more saturated hydrocarbon containing a small amount of dissolved solvent. This may be stripped to recover the more saturated hydrocarbon.

The extract consists essentially of the more unsaturated hydrocarbon dissolved in the solvent. While this may be stripped directly to give a fraction consisting essentially of the more unsaturated hydrocarbon we have found it much superior to extract the extract with a solvent composed chiefly of the component of the blended solvent which exhibits bonding tendencies with the more unsaturated hydrocarbon. This effects transfer of the more unsaturated hydrocarbon from the original extract to the second solvent leaving a raffinate consisting essentially of the blended solvent suitable for recycle to the first extraction. Upon stripping the resulting extract the more unsaturated hydrocarbon is obtained. A portion of this is withdrawn as the more unsaturated hydrocarbon product of the process and the balance is returned for injection as "reflux" into the first extraction zone as described above.

Extraction of the first extract with the single component of the blended solvent in the manner just described effects great savings in heat since the large amount of blended solvent in the first extract is replaced by a relatively small amount of the single solvent. The single solvent is capable of dissolving very much more of the more unsaturated hydrocarbon. In fact the single solvent is generally completely miscible in all proportions with aliphatic unsaturated hydrocarbons. Thus the second extraction greatly reduces the volume of solvent associated with the more unsaturated hydrocarbon and effects a correspondingly great saving in the heat required for stripping.

We have found that tetraethylorthosilicate exhibits a bonding tendency with olefins and diolefins but not with paraffins. The bonding tendency of this compound is shown by the following tabulation which gives the solubility of three gaseous $C_4$ hydrocarbons in this compound and their calculated activity coefficients.

85° F., 1 atm., 5 ml. solvent

|  | Ml. of Gaseous Hydrocarbon Absorbed | Activity Coefficients |
| --- | --- | --- |
| n-Butane | 268.9 | 1.15 |
| Butene-1 | 256.4 | 0.992 |
| Butadiene-1, 3 | 325.6 | 0.883 |

An activity coefficient less than unity indicates negative deviation from ideal solution laws and is an indication of attraction between the solvent and hydrocarbon. This attraction is called loose chemical bonding but may be thought of as simply an attraction between unlike molecules. Whereas n-butane shows positive deviation, the unsaturated hydrocarbons show negative deviation.

We have found that blending tetraethylorthosilicate with a polar solvent not exhibiting a bonding tendency with the unsaturated hydrocarbons gives a solvent having greater selectivity than either solvent alone and greater solubility for the hydrocarbons than the polar solvent. A typical polar solvent namely ethanolamine, was blended with tetraethylorthosilicate by saturating the ethanolamine with tetraethylorthosilicate. The resulting blend was compared with ethanolamine by itself for the relative solubility of the three gaseous $C_4$ hydrocarbons. The following tabulation shows the results which were obtained.

85° F., 1 atm., 5 ml. solvent

|  | Ethanolamine | | Ethanolamine saturated with tetraethylorthosilicate at 70° F. | |
| --- | --- | --- | --- | --- |
|  | Ml. of gaseous hydrocarbon dissolved | Relative Solubility | Ml. of gaseous hydrocarbon dissolved | Relative Solubility |
| n-Butane | 5.65 | 1.00 | 6.7 | 1.00 |
| Butene-1 | 12.55 | 2.22 | 15.7 | 2.34 |
| Butadiene-1,3 | 30.7 | 5.43 | 37.9 | 5.66 |

It will be seen that the blended solvent has a selectivity between paraffins and the unsaturates greater than either solvent alone. The solubility of the hydrocarbon in the blended solvent is greater than in the polar solvent alone. In addition whereas the greater amount of hydrocarbon dissolved in the blended solvent tends to decrease the selectivity, actually the selectivity is shown to be greater. Other polar compounds may be used instead of ethanolamine. Ethanolamine is a good example because it has high selectivity but it is of doubtful usefulness by itself because of low solvent capacity for the hydrocarbons. The presence of the tetraethylorthosilicate increases its capacity for dissolving hydrocarbons and also increases its selectivity between paraffins and unsaturates.

We have found that paraldehyde tends to form loose chemical compounds (i. e. exhibits a bonding tendency) with diolefins but not with olefins or paraffins. This is indicated by the data below where butadiene-1,3 has an activity coefficient of less than unity in the hydrocarbon-paraldehyde system whereas butene-1 and n-butane show positive deviation and so do not tend to form loose chemical compounds with the solvent.

*Vapor-liquid equilibrium 180° F., 100 p. s. i. a.*

| | Gas Phase, Mol. Percent | Liquid Phase, Mol. Percent | Activity Coefficient |
|---|---|---|---|
| Butadiene-1,3 | 22.2 | 13.9 | 0.91 |
| Butene-1 | 50.9 | 27.4 | 1.015 |
| n-Butane | 25.2 | 13.2 | 1.220 |
| Paraldehyde | 1.7 | 45.3 | |

This solvent by itself would be useless for liquid-liquid extraction operations because it is miscible in all proportions at ordinary temperatures. However by blending with a polar solvent to cut down the solubility, the selectivity due to formation of loose chemical bonds with the diolefin plus the selectivity due to the polarity of the solution is obtained and the degree of miscibility can be adjusted.

For example, the solvent ethanolamine, a polar compound characterized by low solubility for hydrocarbons, was saturated with paraldehyde and tested for selectivity. The following tabulation compares the blended solvent with pure ethanolamine.

*85° F., 1 atm., 10 ml. solvent*

| | Ethanolamine | | Ethanolamine Saturated with Paraldehyde at 75° F. | |
|---|---|---|---|---|
| | Ml. | Relative Sol. | Ml. | Relative Sol. |
| n-Butane | 11.3 | 1.00 | 13.4 | 1.00 |
| Butene-1 | 25.1 | 2.22   1.00 | 27.2 | 2.03   1.00 |
| Butadiene-1,3 | 61.4 | 5.43   2.45 | 76.0 | 5.67   2.80 |

From the data it will be seen that the selectivity of the blended solvent is greater than either solvent alone with respect to n-butane and butadiene and much greater with respect to butene and butadiene. The solubility is also greater than ethanolamine alone. The blended solvent is better for the separation of the diolefin from the olefin and paraffin than either of the single solvents because it has greater selectivity, is not completely miscible with the hydrocarbons, and yet has a greater capacity for dissolving hydrocarbon than the polar solvent.

The above data concerns $C_4$ hydrocarbons but the principle of blending the solvents of the present invention can be applied to any mixture of saturated and unsaturated aliphatic hydrocarbons. Usually if not always the hydrocarbon mixture treated by the process of the present invention will consist of hydrocarbons having the same number of carbon atoms per molecule, because it is a simple matter to separate hydrocarbons having different numbers of carbon atoms per molecule by ordinary fractional distillation. The hydrocarbon mixtures treated may range from $C_2$ to $C_8$ or even higher. Generally a $C_4$ or a $C_5$ hydrocarbon stream will be treated by the present invention.

Practically any polar solvent may be employed in carrying out the present invention. As stated above we prefer to use a highly polar compound, i. e. a compound in which normal butane at atmospheric condition exhibits an activity coefficient greater than 10. Examples of such highly polar compounds are: ethanolamine, furfural, furfuryl alcohol, aniline, nitrobenzene, phenyl hydrazine, methyl sulfate, ethylene chlorohydrin, tetraethylene pentamine, diethylene glycol monoethyl ether, levulinic acid, o-anisidine, triethylene glycol, β-hydroxypropionitrile.

Instead of tetraethylorthosilicate or paraldehyde, we may employ any other solvent having a bonding tendency with the more highly unsaturated hydrocarbon, but not with the more saturated hydrocarbons. Examples of other solvents are: 1,1-bis-tert-butyl mercapto ethane, tert-dodecyl thioacetate, dioctyl disulfide, diethyl carbitol.

While the preferred solvent for use in carrying out the present invention is a saturated solution of tetraethylorthosilicate or paraldehyde in ethanolamine, we may employ any other blend of a polar solvent and a solvent exhibiting bonding tendency with unsaturates. The blend should contain a substantial amount of each solvent. Preferably the solvent will consist of the polar solvent saturated with the solvent exhibiting bonding tendency with the unsaturates.

The blended solvent of the present invention may be employed in extractive distillation processes for the separation of aliphatic hydrocarbons of differing degrees of saturation such as paraffins and unsaturates. However, liquid-liquid extraction possesses a number of economical advantages over extractive distillation and is therefore more desirable. Liquid-liquid extraction has not been used heretofore on a commercial scale for the separation of aliphatic hydrocarbons of different degrees of unsaturation. As pointed out above, it is probable that the reason for this failure to use liquid-liquid extraction processes is the limited hydrocarbon solubility in the selective solvents heretofore available. The present invention overcomes this drawback and makes feasible the use of liquid-liquid extraction for this type of separation.

The drawing shows in simplified flow diagram how the separation of a mixture of aliphatic hydrocarbons of different degrees of saturation may be accomplished using the blended solvent of the present invention with a double liquid-liquid extraction process which results in a great saving of heat over either extractive distillation or simple liquid-liquid extraction.

Referring to the drawing, a feed stream of aliphatic hydrocarbons to be separated and comprising for example paraffins together with olefins and/or diolefins, is fed via line 1 into the center of a multiple stage liquid-liquid contacting column 2 operated at a pressure sufficient to maintain liquid conditions. The blended solvent, typically a polar compound, such as ethanolamine, saturated with tetraethylorthosilicate is fed from storage 3 via line 4 into column 2 near or at the top and contacted countercurrently with the rising hydrocarbon stream. The upper section of column 2 (i. e. the part above the point of feed entry) acts as a stripping section where the unsaturates are nearly all or completely removed from the hydrocarbon stream. The overhead stream, constituting the raffinate, is removed via line 5. This raffinate consists essentially of paraffin hydrocarbon and dissolved solvent constituents. The paraffinic hydrocarbon is recovered as a nearly pure stream by stripping the raffinate in a distillation column 6. The resulting bottoms product, consisting essentially of recovered solvent components may be returned via line 7 to blended solvent storage 3. The solvent may be cooled in cooler 7A prior to its return. As is usual, stripper column 6 is provided with a reboiler 8 and the feed to the column is introduced at the top. The stripped essentially pure paraffinic hydrocarbon overhead is withdrawn from column 6 via line 9. A portion of this overhead stream may be condensed and returned as reflux (not shown) to the top of column 6. Of course, enough solvent must be used in the extraction conducted in extractor 2 so that all the non-polar constituent, tetraethylorthosilicate in this case, is not dissolved in the hydrocarbon stream 5 from the extractor 2.

The lower part of extraction column 2 (i. e. the portion below the point of entry of feed line 1) acts as an enriching section whereby the solvent from the stripping section is contacted with a hydrocarbon reflux stream consisting essentially of the unsaturated hydrocarbon and introduced near or at the bottom of column 2 via line 10. The stream withdrawn via line 11 from the bottom of column 2 consists essentially of mixed solvent and dissolved unsaturates. The unsaturated hydrocarbon may be recovered by a stripping operation at this point but the amount of solvent is large and the heat consumption would be excessive.

We have found that a large saving in heat consumption may be effected by carrying out another extraction by contacting the stream flowing in line 11 with a stream of tetraethylorthosilicate introduced via line 12 to a second multiple stage liquid-liquid extracting column 13. This gives a stream of polar solvent saturated with tetraethylorthosilicate (raffinate), withdrawn from column 13 via line 14 and a stream of tetraethylorthosilicate saturated with the polar solvent and containing the unsaturated hydrocarbon (extract), withdrawn via line 15. The raffinate is returned via line 14 to blended solvent storage 3. The extract is passed via line 15 to distillation column 16 which serves to strip the unsaturated hydrocarbon from the solvent. The stripped solvent is returned via line 17 and cooler 17A to tetraethylorthosilicate solvent storage 18.

The unsaturated hydrocarbon stripped in column 16 is withdrawn overhead via line 19. Condenser 19A may be employed to cool and condense the overhead vapors. A portion of the resulting liquid condensate may be returned as reflux (not shown) to the top of stripper 16. The balance of the condensate is split into two streams, one stream being returned via line 10 to the bottom of extractor 2 and the other stream being withdrawn via line 20 as the unsaturated hydrocarbon product of the process.

An important advantage of the second extraction carried out in extractor 13 is that, tetraethylorthosilicate being completely miscible with the hydrocarbon, the second extraction greatly reduces the volume of solvent associated with the hydrocarbon before the stripping operation carried out in column 16 thus resulting in a large saving in the heat required for the stripping.

It is noted that whereas the feed line 1 enters the first extractor 2 at an intermediate point therein, say at or near the mid-point, the resulting extract flowing in line 11 enters the second extractor 13 at a point adjacent the top thereof. The reason for this is that column 2 is effecting a separation between paraffins and unsaturates and embodies an upper or stripping section wherein the unsaturates are substantially completely removed from the hydrocarbon stream and a lower or enriching section wherein the downwardly flowing solvent is contacted with a stream consisting essentially of unsaturated hydrocarbon to effect displacement of paraffin from solution in the solvent; whereas column 13 is effecting only separation of a major portion or substantially all of the mixed solvent from the unsaturated hydrocarbon by employment of tetraethylorthosilicate as a solvent which functions to selectively dissolve the hydrocarbon from the blended solvent.

Countercurrent liquid-liquid extraction is conducted in each of extractors 2 and 13, conditions being such that all components are in liquid phase and proportions of incoming streams and conditions being such that two phases are present, each in substantial amount. The extractions are ordinarily carried out at atmospheric temperature.

In operation the stream of tetraethylorthosilicate flowing in line 12 from storage 18 to the bottom of extractor 13 is saturated with the polar solvent. This is for the reason that the equilibrium attained in extraction unit 13 is such that the extract withdrawn via line 15 comprises tetraethylorthosilicate saturated with the polar solvent as well as containing the unsaturated hydrocarbon. The presence of the resulting small amount of polar solvent in the tetraethylorthosilicate fed via line 12 to unit 13 does not affect the operation adversely so that no means for separating the polar solvent from the tetraethylorthosilicate is necessary.

In practice a phase of tetraethylorthosilicate saturated with the polar solvent tends to build up in the blended solvent storage 3 and must be withdrawn occasionally in order that proper operation may be attained.

While the drawing has been described with reference to the separation of unsaturated aliphatic hydrocarbon from paraffin hydrocarbon using ethanolamine and tetraethylorthosilicate as solvents, the same arrangement of equipment and mode of operation may be employed for other separations such as aliphatic diolefins from aliphatic olefins or from mixtures of olefins and paraffins using appropriate solvents. In such case the olefin or mixture of olefin and paraffin will replace the paraffin and be removed via line 9 while the diolefin product will be removed via line 20.

We claim:

1. The method of separating a hydrocarbon mixture containing aliphatic unsaturated hydrocarbon having at least one and not more than two double bonds per molecule and more saturated aliphatic hydrocarbon into a fraction rich in more saturated hydrocarbon and a fraction rich in more unsaturated hydrocarbon which comprises intimately contacting said mixture with a liquid selective solvent consisting essentially of a polar solvent in which normal butane has an activity coefficient greater than 10 at atmospheric condition and a nonpolar solvent in which n-butane has an activity coefficient between 1.0 and 2.0 and in which at least one of butene and butadiene has an activity coefficient less than 1.0 and selected from the group consisting of paraldehyde and tetraethylorthosilicate and thereby effecting preferential dissolution of said more unsaturated hydrocarbon in said selective solvent.

2. The method of separating a hydrocarbon mixture containing at least one aliphatic unsaturated hydrocarbon having at least one and not more than two double bonds per molecule and a corresponding paraffin hydrocarbon into a fraction rich in said paraffin hydrocarbon and a fraction rich in unsaturated hydrocarbon which comprises intimately contacting said mixture with a liquid selective solvent consisting essentially of a polar solvent in which normal butane has an activity coefficient greater than 10 at atmospheric condition and a non-polar solvent in which n-butane has an activity coefficient between 1.0 and 2.0 and in which at least one of butene and butadiene has an activity coefficient less than 1.0 and selected from the group consisting of paraldehyde and tetraethylorthosilicate and thereby effecting preferential dissolution of unsaturated hydrocarbon in said selective solvent.

3. The method of separating a hydrocarbon mixture containing aliphatic unsaturated hydrocarbon having at least one and not more than two double bonds per molecule and more saturated aliphatic hydrocarbon into a fraction rich in more saturated hydrocarbon and a fraction rich in more unsaturated hydrocarbon which comprises intimately contacting said mixture with a liquid selective solvent consisting essentially of a polar solvent in which normal butane has an activity coefficient greater than 10 at atmospheric condition saturated with tetraethylorthosilicate and thereby effecting preferential dissolution of said more unsaturated hydrocarbon in said selective solvent.

4. The method of separating a hydrocarbon mixture containing at least one aliphatic unsaturated hydrocarbon having at least one and not more than two double bonds per molecule and a corresponding paraffin hydrocarbon into a fraction rich in said paraffin hydrocarbon and a fraction rich in unsaturated hydrocarbon which comprises intimately contacting said mixture with a liquid selective solvent consisting essentially of ethanolamine saturated with tetraethylorthosilicate and thereby effecting preferential dissolution of unsaturated hydrocarbon in said selective solvent.

5. The method of separating a hydrocarbon mixture containing at least one aliphatic diolefin hydrocarbon and corresponding more saturated aliphatic hydrocarbon into a fraction rich in said more saturated hydrocarbon and a fraction rich in diolefin hydrocarbon which comprises intimately contacting said mixture with a liquid selective solvent consisting essentially of ethanolamine saturated with paraldehyde and thereby effecting preferential dissolution of diolefin hydrocarbon in said selective solvent.

6. The method of separating a hydrocarbon mixture containing aliphatic unsaturated hydrocarbon having at least one and not more than two double bonds per molecule and more saturated aliphatic hydrocarbon into a fraction rich in more saturated hydrocarbon and a fraction rich in more unsaturated hydrocarbon which comprises subjecting said mixture to liquid-liquid extraction with a liquid selective solvent consisting essentially of a polar solvent in which normal butane has an activity coefficient greater than 10 at atmospheric condition and a non-polar solvent in which n-butane has an activity coefficient between 1.0 and 2.0 and in which at least one of butene and butadiene has an activity coefficient less than 1.0 and selected from the group consisting of paraldehyde and tetraethylorthosilicate and thereby effecting preferential dissolution of said more unsaturated hydrocarbon in said selective solvent.

7. The method of separating an aliphatic hydrocarbon mixture containing at least one aliphatic unsaturated hydrocarbon having at least one and not more than two double bonds per molecule and a corresponding paraffin hydrocarbon into a fraction rich in said paraffin hydrocarbon and a fraction rich in unsaturated hydrocarbon which comprises subjecting said mixture to liquid-liquid extraction with a liquid selective solvent consisting essentially of ethanolamine saturated with tetraethylorthosilicate and thereby effecting preferential dissolution of unsaturated hydrocarbon in said selective solvent.

8. The method of separating an aliphatic hydrocarbon mixture containing aliphatic diolefin hydrocarbon and corresponding more saturated aliphatic hydrocarbon into a fraction rich in said more saturated hydrocarbon and a fraction rich in diolefin hydrocarbon which comprises subjecting said mixture to liquid-liquid extraction with a liquid selective solvent consisting essentially of ethanolamine saturated with paraldehyde and thereby effecting preferential dissolution of diolefin hydrocarbon in said selective solvent.

9. The method of separating an aliphatic $C_4$ hydrocarbon mixture consisting essentially of butane and an unsaturated $C_4$ hydrocarbon selected from the group consisting of butene and butadiene into a fraction rich in butane and a fraction rich in said unsaturated $C_4$ hydrocarbon which comprises subjecting said mixture to liquid-liquid extraction with a liquid selective solvent consisting essentially of ethanolamine saturated with tetraethylorthosilicate and thereby effecting preferential dissolution of unsaturated $C_4$ hydrocarbon in said selective solvent.

10. The method of separating an aliphatic $C_4$ hydrocarbon mixture consisting essentially of butadiene and more saturated aliphatic $C_4$ hydrocarbon into a fraction rich in butadiene and a fraction rich in said more saturated aliphatic $C_4$ hydrocarbon which comprises subjecting said mixture to liquid-liquid extraction with a liquid selective solvent consisting essentially of ethanolamine saturated with paraldehyde and thereby effecting preferential dissolution of said butadiene in said solvent.

11. The method of separating a hydrocarbon mixture containing aliphatic unsaturated hydrocarbon having at least one and not more than two double bonds per molecule and more saturated aliphatic hydrocarbon into a fraction rich in more saturated hydrocarbon and a fraction rich in more unsaturated hydrocarbon which comprises subjecting said mixture to liquid-liquid extraction with a liquid selective solvent consisting essentially of a polar solvent in which normal butane has an activity coefficient greater than 10 at atmospheric condition saturated with a non-polar solvent in which n-butane has an activity coefficient between 1.0 and 2.0 and in which at least one of butene and butadiene has an activity coefficient less than 1.0 and selected from the group consisting of paraldehyde and tetraethylorthosilicate and thereby effecting preferential dissolution of said more unsaturated hydrocarbon in said selective solvent, withdrawing the resulting extract consisting essentially of a solution of said more unsaturated hydrocarbon in said selective solvent, extracting said extract in a separate zone with a solvent consisting essentially of said non-polar solvent and thereby forming a second extract consisting essentially of said more unsaturated hydrocarbon and the second-named solvent and a raffinate consisting essentially of said polar solvent saturated with said non-polar solvent, said second extract containing much less solvent than said first-named extract, and stripping the more unsaturated hydrocarbon from said second extract by heating same.

12. The method of separating a hydrocarbon mixture containing aliphatic unsaturated hydrocarbon having at least one and not more than two double bonds per molecule and more saturated aliphatic hydrocarbon into a fraction rich in more saturated hydrocarbon and a fraction rich in more unsaturated hydrocarbon which comprises subjecting said mixture to liquid-liquid extraction with a liquid selective solvent consisting essentially of a polar solvent in which normal butane has an activity coefficient greater than 10 at atmospheric condition and a non-polar solvent in which n-butane has an activity coefficient between 1.0 and 2.0 and in which at least one of butene and butadiene has an activity coefficient less than 1.0 and selected from the group consisting of paraldehyde and tetraethylorthosilicate and thereby effecting preferential dissolution of said more unsaturated hydrocarbon in said selective solvent, withdrawing the resulting extract, introducing a stream of said more unsaturated hydrocarbon into the extract in the extraction zone just prior to withdrawal thereof to displace any more saturated hydrocarbon dissolved therein, treating the resulting extract in such manner as to strip the dissolved more unsaturated hydrocarbon therefrom, withdrawing a portion of the more unsaturated hydrocarbon so produced as one product of the process and recycling another portion thereof to the extraction zone for said displacement effect.

13. The method of separating an aliphatic hydrocarbon mixture consisting essentially of aliphatic hydrocarbons of different degrees of unsaturation and at least as saturated as a diolefin which comprises introducing said mixture into a vertical liquid-liquid first extraction zone at an intermediate point, introducing a selective solvent composed of a polar solvent in which normal butane has an activity coefficient greater than 10 at atmospheric condition saturated with a non-polar solvent in which n-butane has an activity coefficient between 1.0 and 2.0 and in which at least one of butene and butadiene has an activity coefficient less than 1.0 and selected from the group consisting of paraldehyde and tetraethylorthosilicate into the top of said zone and intimately countercurrently contacting said mixture therewith, introducing a reflux stream composed of more unsaturated hydrocarbon recovered from a stripping operation hereinafter identified into the bottom of said zone, withdrawing the extract consisting essentially of solvent and dissolved more unsaturated hydrocarbon from the bottom of said zone and raffinate consisting essentially of more saturated hydrocarbon and dissolved solvent from the top of said zone, passing said extract to a second extraction zone and there countercurrently extracting it liquid-liquid with a solvent consisting essentially of said non-polar solvent with more unsaturated hydrocarbon, withdrawing the resulting second extract consisting essentially of said last-named solvent and the more unsaturated hydrocarbon which was dissolved in the first-named extract and a raffinate phase consisting essentially of said polar solvent saturated with said non-polar solvent, stripping the first-named raffinate to separately recover the more saturated hydrocarbon and the solvent, recycling the resulting solvent and the second raffinate as solvent to the first extraction zone, stripping the second extract to separately recover the more unsaturated hydrocarbon as one product and said non-polar solvent, withdrawing a portion of the more unsaturated hydrocarbon as one product and recycling the balance thereof to the bottom of said first extraction zone, and recycling the recovered non-polar solvent to said second extraction zone as the solvent therefor.

14. As a new article of manufacture, a selective solvent useful for separating aliphatic hydrocarbons of different degrees of unsaturation consisting of a polar solvent in which normal butane at atmospheric condition has an activity coefficient greater than 10 and tetraethylorthosilicate.

15. As a new article of manufacture, a selective solvent useful for separating unsaturated aliphatic hydrocarbons from paraffin hydrocarbons consisting of ethanolamine saturated with tetraethylorthosilicate.

16. The method of separating an aliphatic hydrocarbon mixture consisting essentially of aliphatic hydrocarbons of different degrees of unsaturation and at least as saturated as a di-olefin which comprises introducing said mixture into a vertical liquid-liquid first extraction zone at an intermediate point, introducing a selective solvent composed of ethanolamine saturated with tetraethylorthosilicate into the top of said zone and intimately countercurrently contacting said mixture therewith, introducing a reflux stream composed of more unsaturated hydrocarbon recovered from a stripping separation hereinafter identified into the bottom of said zone, withdrawing the extract consisting essentially of solvent and dissolved more unsaturated hydrocarbon from the bottom of said zone and raffinate consisting essentially of more saturated hydrocarbon and dissolved solvent from the top of said zone, passing said extract to a second extraction zone and there countercurrently extracting at liquid-liquid with a solvent consisting essentially of tetraethylorthosilicate, withdrawing the resulting second extract consisting essentially of said last-named solvent and the more unsaturated hydrocarbon which was dissolved in the first-named extract and a raffinate phase consisting essentially of ethanolamine saturated with tetraethylorthosilicate, stripping the first-named raffinate to separately recover the more saturated hydrocarbon and the solvent, recycling the resulting solvent and the second raffinate as solvent to the first extraction zone, stripping the second extract to separately recover the more unsaturated hydrocarbon as one product and tetraethylorthosilicate, withdrawing a portion of the more unsaturated hydrocarbon as one product and recycling the balance thereof to the bottom of said first extraction zone, and recycling the recovered tetraethylorthosilicate to said second extraction zone as the solvent therefor.

17. As a new article of manufacture, a selective solvent useful for separating aliphatic diolefins from more saturated aliphatic hydrocarbons consisting of ethanolamine saturated with paraldehyde.

BERTRAND J. MAYLAND.
EDWARD E. WHITE.

REFERENCES CITED

The following references are of record in the file of this patent:

UNITED STATES PATENTS

| Number | Name | Date |
| --- | --- | --- |
| 845,616 | Chute | Feb. 26, 1907 |
| 2,081,719 | Van Dijck | May 25, 1937 |
| 2,100,429 | Bray | Nov. 30, 1937 |
| 2,138,832 | Brown et al. | Dec. 6, 1938 |
| 2,201,821 | Andrews et al. | May 21, 1940 |
| 2,281,598 | Prutton | May 5, 1942 |
| 2,365,898 | Morris et al. | Dec. 26, 1944 |
| 2,379,332 | Arnold | June 26, 1945 |
| 2,381,506 | Loane | Aug. 7, 1945 |
| 2,396,300 | Cummings et al. | Mar. 12, 1946 |
| 2,422,341 | Crouch | June 14, 1947 |

FOREIGN PATENTS

| Number | Country | Date |
| --- | --- | --- |
| 413,307 | Great Britain | July 11, 1934 |